United States Patent
Mukunashi

(10) Patent No.: US 10,397,480 B2
(45) Date of Patent: Aug. 27, 2019

(54) IMAGE STABILIZATION APPARATUS, AND CONTROL METHOD AND STORAGE MEDIUM THEREOF

(71) Applicant: CANON KABUSHIKI KAISHA, Tokyo (JP)

(72) Inventor: Masayuki Mukunashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 263 days.

(21) Appl. No.: 15/608,499

(22) Filed: May 30, 2017

(65) Prior Publication Data
US 2017/0353664 A1 Dec. 7, 2017

(30) Foreign Application Priority Data
Jun. 1, 2016 (JP) ................... 2016-110216

(51) Int. Cl.
*G06T 5/00* (2006.01)
*G02B 27/64* (2006.01)
*H04N 5/232* (2006.01)

(52) U.S. Cl.
CPC ....... *H04N 5/23264* (2013.01); *G02B 27/644* (2013.01); *G02B 27/646* (2013.01); *G06T 5/002* (2013.01); *H04N 5/23251* (2013.01); *H04N 5/23296* (2013.01)

(58) Field of Classification Search
CPC ........... H04N 5/23264; H04N 5/23251; H04N 5/23296; G02B 27/644; G02B 27/646; G06T 5/002
See application file for complete search history.

(56) References Cited

U.S. PATENT DOCUMENTS

| 2013/0093905 A1* | 4/2013 | Saitsu | H04N 5/23258 348/208.4 |
|---|---|---|---|
| 2014/0186017 A1* | 7/2014 | Shibata | H04N 5/23248 396/55 |
| 2014/0303687 A1* | 10/2014 | Wall, III | A61F 9/08 607/54 |
| 2014/0354834 A1* | 12/2014 | Narita | H04N 5/23287 348/208.4 |

(Continued)

FOREIGN PATENT DOCUMENTS

JP 04-163535 A 6/1992

*Primary Examiner* — Timothy J Henn
(74) *Attorney, Agent, or Firm* — Cowan, Liebowitz & Latman, P.C.

(57) ABSTRACT

An image stabilization apparatus includes: a first calculation unit configured to calculate an angular velocity of movement of an image capturing apparatus; a second calculation unit configured to calculate a moving amount of an object from a plurality of images; a third calculation unit configured to calculate an angular velocity of movement of the object; a determination unit configured to determine whether or not the object is walking; and a selection unit configured to select, based on a determination result of the determination unit, whether to perform control such that an image stabilization unit corrects image blur based on the angular velocities calculated by the first calculation unit and the third calculation unit, or such that the image stabilization unit corrects image blur based on the angular velocity calculated by the first calculation unit.

12 Claims, 13 Drawing Sheets

(56) References Cited

U.S. PATENT DOCUMENTS

2015/0022712 A1* 1/2015 Koishi .................... G02B 7/28
                                                        348/352
2017/0187960 A1* 6/2017 Tsuchiya ............ H04N 5/23258
2017/0214853 A1* 7/2017 Koyano ............... G02B 27/646

* cited by examiner

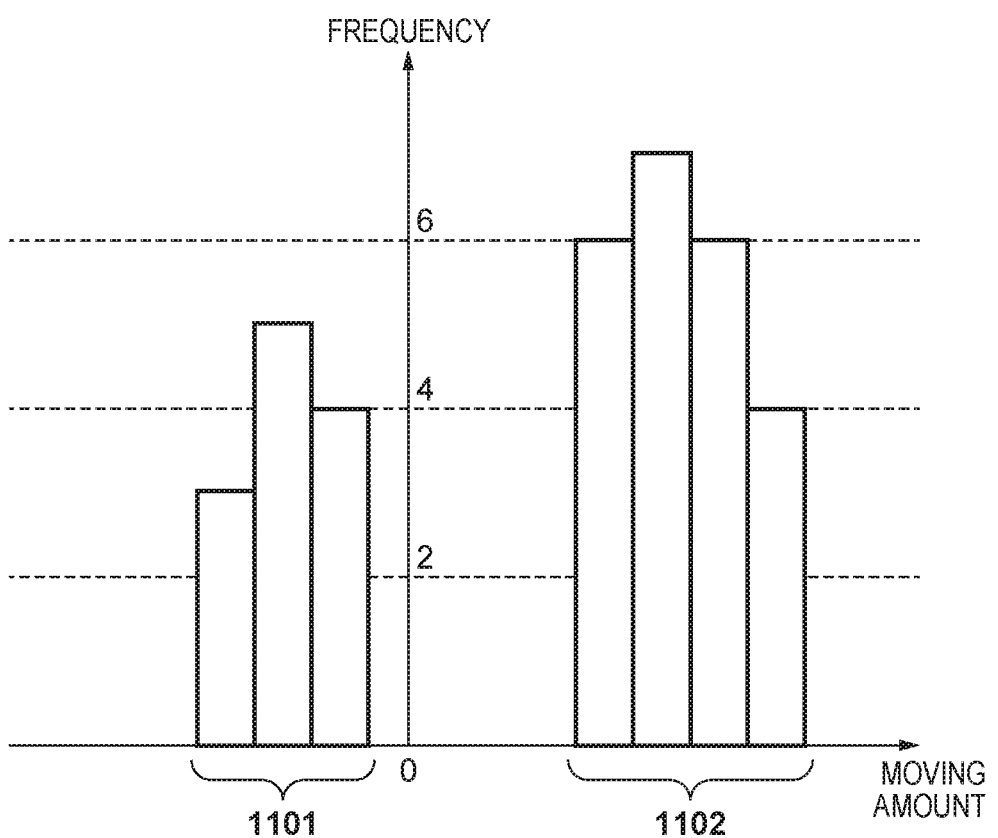

IMAGE STABILIZATION APPARATUS, AND CONTROL METHOD AND STORAGE MEDIUM THEREOF

BACKGROUND OF THE INVENTION

Field of the Invention

The present invention relates to technology to correct image blur that occurs when performing a panning shot in an image capturing apparatus.

Description of the Related Art

Conventionally, a technique called a panning shot is known as a shooting technique that expresses a feeling of speed of a moving object. This shooting technique, by a user panning a camera according to movement of an object, aims to stop motion of the moving object while allowing a background to flow. When shooting a panning shot, it is necessary for the user to pan the camera according to movement of the object, but if the panning speed is too fast or too slow, a difference may occur between the moving speed of the object and the panning speed. In this case, the object whose motion the user wishes to stop within a screen often is blurred in a resulting image.

In order to solve this problem, the following sort of technology is disclosed in Japanese Patent Laid-Open No. 4-163535. That is, based on a "relative angular velocity of the object relative to the image capturing apparatus calculated before exposure", and an "angular velocity of the image capturing apparatus during exposure obtained from an angular velocity sensor", part of an optical system of a lens or an image capturing unit is moved to correct blurring of the object (object blur) during exposure. The relative angular velocity of the object relative to the image capturing apparatus is calculated from a "moving amount on the image plane of the object detected from temporally consecutive images" and "output of the angular velocity sensor".

However, according to the conventional technology disclosed in above Japanese Patent Laid-Open No. 4-163535, it is assumed that the movement of the object before exposure is not significantly different than the movement of the object during exposure. For example, in a case where the object is a person who is walking (including a person who is running), because the body of the person moves back and forth vertically, even if the above assumption is satisfied in the traveling direction, this assumption is not satisfied for a direction orthogonal to the traveling direction. In other words, relative to the image capturing apparatus, an object that was moving downward during movement detection of the object before exposure may move upward in the opposite direction during exposure. In this case, if blur correction is performed without modification, there are cases where correction is performed in the opposite direction (opposite correction), resulting in an image that is even more blurred.

FIGS. 13A and 13B are graphs showing changes in angular velocity in the vicinity of the face of a walking person, as an example. In these graphs, the horizontal axis indicates time and the vertical axis indicates angular velocity. FIG. 13A is a graph of angular velocity change in the horizontal direction of a walking person, and here the angular velocity gradually increases, but is moving in one direction. On the other hand, FIG. 13B is a graph of angular velocity change in the vertical direction of a walking person, and the person who is the object is moving downward during detection of angular velocity, but is moving upward during exposure. In this case, a correction method as described in Japanese Patent Laid-Open No. 4-163535 cannot be used.

SUMMARY OF THE INVENTION

The present invention was made in consideration of the problems described above, and enables a good panning shot to be performed even in the case of a panning shot of a person who is walking.

According to a first aspect of the present invention, there is provided an image stabilization apparatus, comprising: a first calculation unit configured to calculate an angular velocity of movement of an image capturing apparatus; a second calculation unit configured to calculate a moving amount of an object from a plurality of images captured by an image capturing unit of the image capturing apparatus; a third calculation unit configured to calculate an angular velocity of movement of the object based on output of the first and second calculation units; a determination unit configured to determine whether or not the object is walking; and a selection unit configured to select, based on a determination result of the determination unit, whether to perform control such that an image stabilization unit corrects image blur of the object based on the angular velocity of movement of the image capturing apparatus calculated by the first calculation unit and the angular velocity of movement of the object calculated by the third calculation unit, or such that the image stabilization unit corrects image blur of the object based on the angular velocity of movement of the image capturing apparatus calculated by the first calculation unit.

According to a second aspect of the present invention, there is provided a control method of an image stabilization apparatus, comprising: first calculation of calculating an angular velocity of movement of an image capturing apparatus; second calculation of calculating a moving amount of an object from a plurality of images captured by an image capturing unit of the image capturing apparatus; third calculation of calculating an angular velocity of movement of the object based on output of the first calculation and the second calculation; determining whether or not the object is walking; and selecting, based on a determination result in the determining, whether to perform control such that an image stabilization unit corrects image blur of the object based on the angular velocity of movement of the image capturing apparatus calculated by the first calculation and the angular velocity of movement of the object calculated by the third calculation, or such that the image stabilization unit corrects image blur of the object based on the angular velocity of movement of the image capturing apparatus calculated by the first calculation.

Further features of the present invention will become apparent from the following description of exemplary embodiments with reference to the attached drawings.

BRIEF DESCRIPTION OF THE DRAWINGS

FIG. 9 shows a moving amount histogram.

DESCRIPTION OF THE EMBODIMENTS

Following is a detailed description of embodiments of the present invention with reference to the accompanying drawings.

First Embodiment

Figure 1:
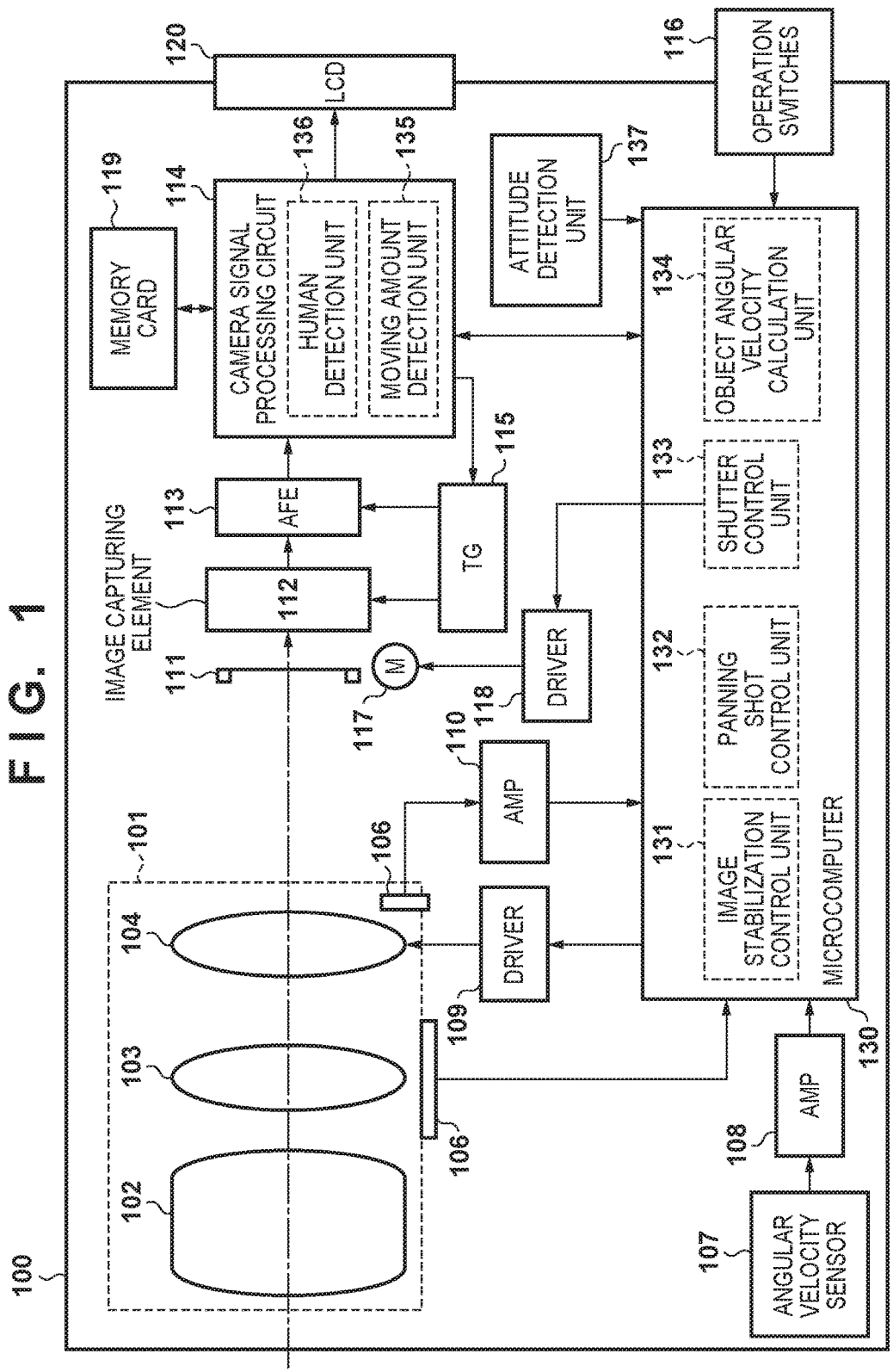
FIG. 1 is a block diagram showing a configuration of a camera serving as a first embodiment of an image capturing apparatus equipped with an image stabilization apparatus of the present invention.

FIG. 1 is a block diagram showing a configuration of a camera serving as a first embodiment of an image capturing apparatus equipped with an image stabilization apparatus of the present invention. In FIG. 1, a lens integrated with a camera body is incorporated in the camera 100. However, the present invention is not limited to a camera configured with the lens and the camera body integrated together as a single body, but is also applicable to a single lens reflex-type camera in which the lens is detachable from the camera body.

The camera 100 is provided with a shooting lens unit 101. The shooting lens unit 101 includes a main image capturing optical system 102, a zoom lens group 103 capable of changing focal length, and a shift lens group 104 that, by moving in a direction perpendicular to an optical axis, optically corrects image blur with respect to the optical axis caused by shake of the camera 100. Also, the camera 100 is provided with a zoom encoder 105 that detects the position of the zoom lens group 103, a position sensor 106 that detects the current position of the shift lens group 104, and an angular velocity sensor 107 that detects shake of the camera 100. Also, the camera 100 is provided with an amplifier 108 that amplifies output of the angular velocity sensor 107, a microcomputer 130 used in camera control, a driver 109 that drives the shift lens group 104, and an amplifier 110 that amplifies output of the position sensor 106 of the shift lens group 104.

The camera 100 is further provided with a shutter 111, an image capturing element 112 such as a CMOS sensor, an analog signal processing circuit 113, a camera signal processing circuit 114, and a timing generator 115 that sets an operation timing of the image capturing element 112 and the analog signal processing circuit 113. The camera 100 is further provided with operation switches 116 including a power switch, a release switch, a panning shot assist mode selection switch, and the like, a shutter drive motor 117, and a driver 118 that drives the shutter drive motor 117. Also, the camera 100 is provided with a memory card 119 that records a shot video, and a liquid crystal panel (referred to below as an LCD) 120 used to monitor an image that a user is attempting to shoot with the camera 100, or to display an image that was shot. The LCD 120 can perform a live view display by continuously displaying video that was shot. Furthermore, the camera 100 is provided with an attitude detection unit 137 that detects the attitude of the camera 100 relative to the direction of gravity. It is possible to determine whether the camera 100 is positioned horizontally (a normal position) or vertically (a vertical position) according to information detected by the posture detection unit 137. An acceleration sensor or the like can be used as the attitude detection unit 137.

The camera signal processing circuit 114 includes a moving amount detection unit 135 and a human detection unit 136. The microcomputer 130 includes an image stabilization control unit 131 that performs image stabilization control, a panning shot control unit 132 that performs panning shot assist control, a shutter control unit 133 that performs shutter control, and an object angular velocity calculation unit 134 that calculates an angular velocity of an object. The microcomputer 130 also performs focus lens control, aperture control, and the like, but they are omitted here in order to more easily understand the drawing. Also, in order to perform image stabilization, shake detection and correction are performed with respect to two orthogonal axes, for example such as the horizontal direction and the vertical direction, but the configuration with respect to the horizontal direction and the configuration with respect to the vertical direction are exactly the same, so here only the configuration with respect to the direction of one axis is described.

In FIG. 1, when the camera power is turned on by the power switch included among the operation switches 116, the microcomputer 130 detects that state change, power is supplied to each circuit of the camera 100, and initial settings are performed. In a normal mode in which the panning shot assist mode has not been set, the angular velocity sensor 107 detects camera shake due to hand shake or the like, and based on the results of that detection, the image stabilization control unit 131 drives the shift lens 104, and image stabilization operation is performed.

Figure 2:
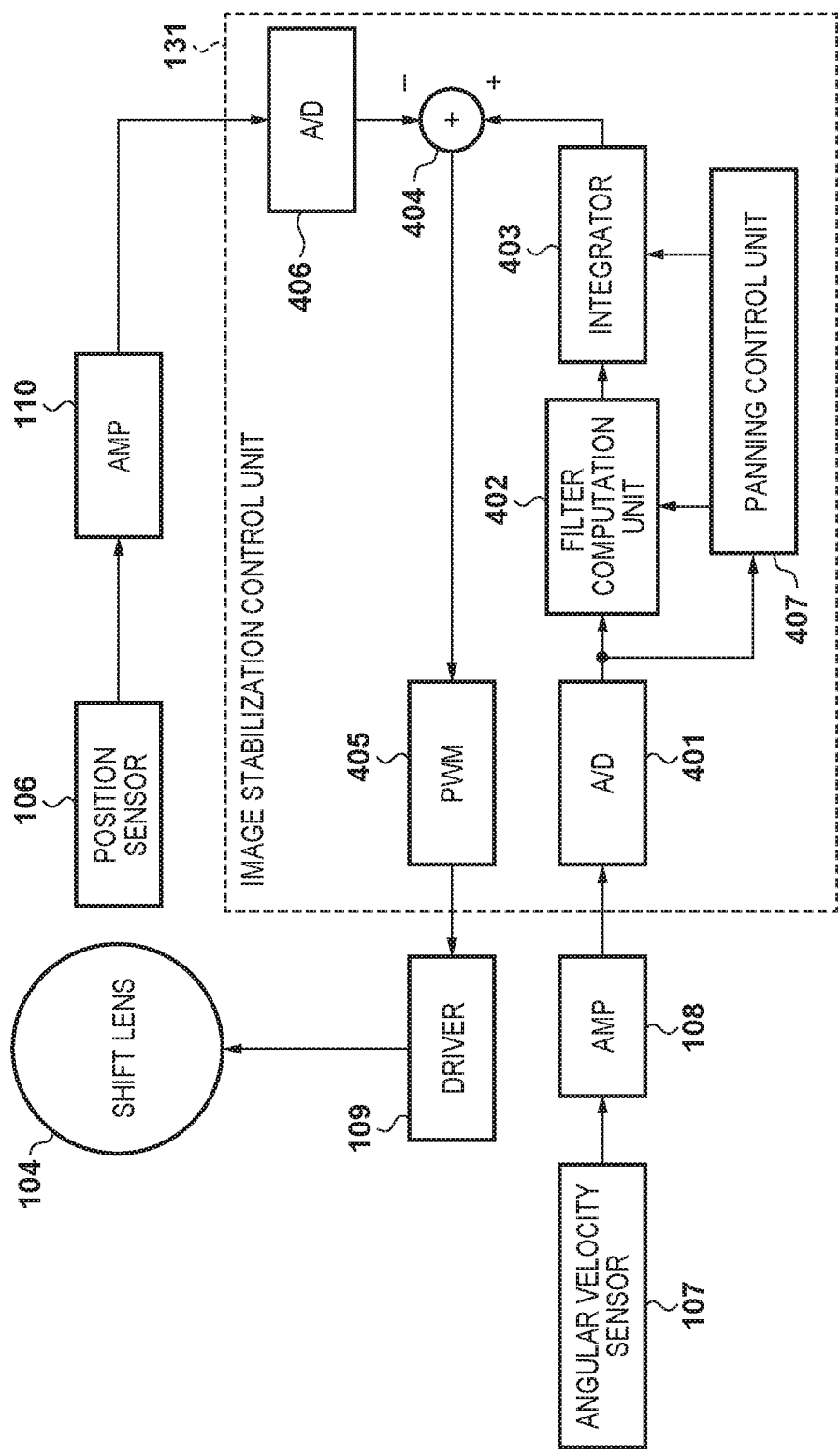
FIG. 2 is a block diagram showing a configuration of an image stabilization apparatus.

Here, the image stabilization function will be described. FIG. 2 is a block diagram showing the configuration of the image stabilization apparatus, with the same reference numerals assigned to configurations that are the same as in FIG. 1, and a description of those configurations is omitted here. In FIG. 2, the image stabilization control unit 131 is provided with an A/D converter 401, a filter computation unit 402, an integrator 403, an adder 404, a PWM output unit 405, an A/D converter 406, and a panning control unit 407. The A/D converter 401 converts a shake signal detected by the angular velocity sensor 107 into a digital signal. The output data of the angular velocity sensor 107 is sampled at a frequency of about 1 to 10 kHz. The filter computation unit 402, configured with a high pass filter (HPF) or the like, removes an offset component included in the output of the angular velocity sensor 107, and also performs a panning countermeasure by changing a cutoff frequency. The integrator 403 converts angular velocity data into angular displacement data in order to generate driving target data of the shift lens. The A/D converter 406 converts output of the position sensor 106, which detects the position of the shift lens group 104, into digital data. The adder 404 subtracts the current shift lens position from the driving target value of the shift lens group 104 to calculate actual driving amount data of the shift lens group 104. The PWM output unit 405 outputs the calculated driving amount data to the driver 109 that drives the shift lens. The panning control unit 407 determines whether or not the camera 100 is being panned from the state of the angular velocity data. Also, if determined that panning is being performed, control of changing the cutoff frequency of the filter computation unit 402, and adjustment of output of the integrator 403, are performed.

Figure 3:
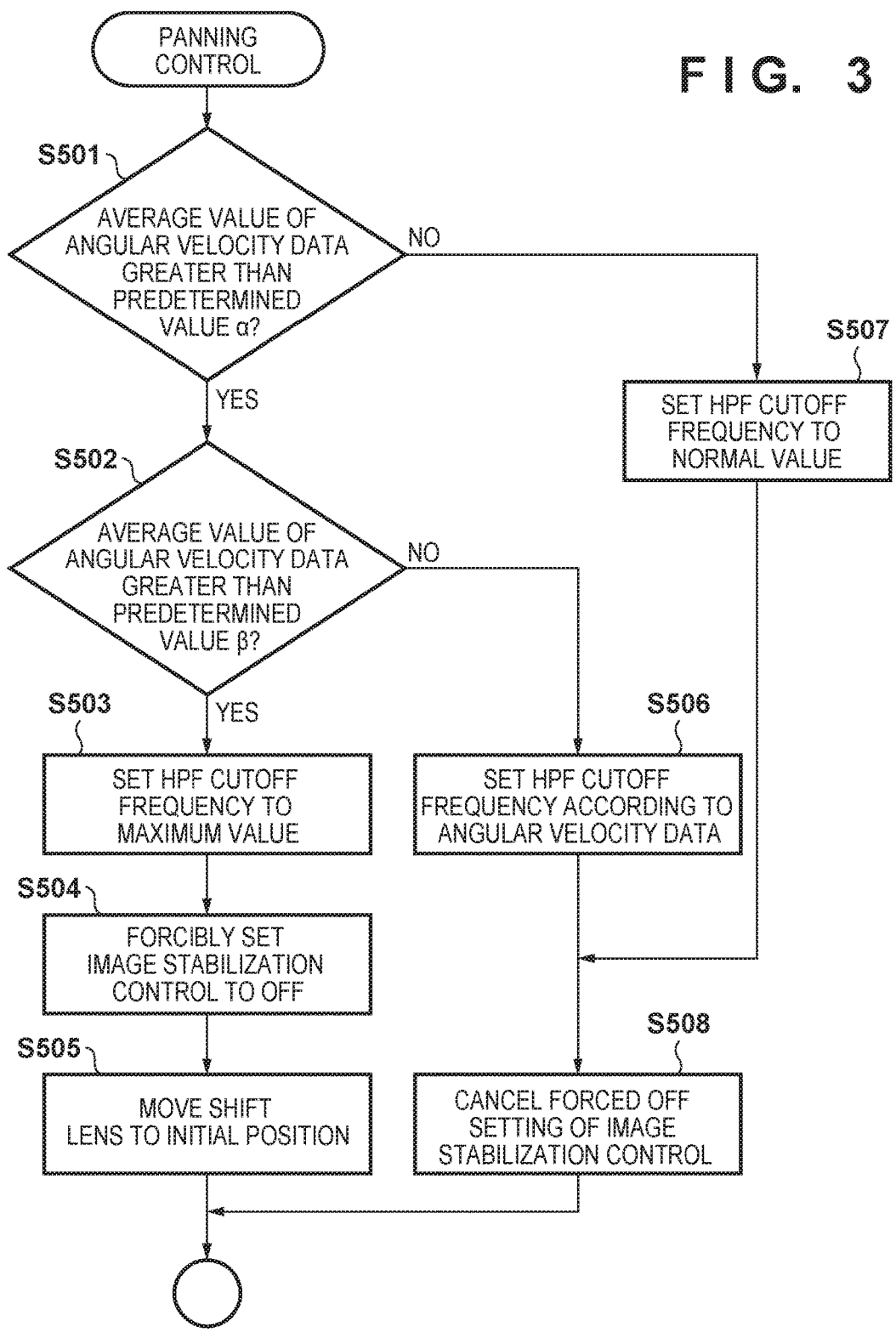
FIG. 3 is a flowchart showing an example of operation of panning control.

FIG. 3 is a flowchart showing an example of operation of panning control by the image stabilization control unit 131 within the microcomputer 130. Below, panning control is described with reference to FIG. 3.

In FIG. 3, in step S501, it is determined whether or not an average value (an average value of a predetermined number of instances of sampling) of the angular velocity data that was converted into a digital value by the A/D converter 401 is greater than a predetermined value α. When the average value is the predetermined value α or less, it is determined that panning is not being performed. When the average value is greater than the predetermined value α, in step S502 it is determined whether or not the average value is greater than a predetermined value β. When the average value is the predetermined value β or less, it is judged that slow panning is being performed. On the other hand, when the average value is greater than the predetermined value β, it is judged that fast panning is being performed, in step S503 the cutoff frequency of the HPF within the filter computation unit 402 is set to a maximum value, and in step S504 image stabilization control is forcibly set to off. The reason for this is to cause the shift lens to gradually stop by increasing the cutoff frequency of the HPF, and eliminate a sense of discomfort when the image stabilization control is switched off. Another reason is so that there is no sense of discomfort even if camera shake remains due to switching off image stabilization because the moving amount caused by panning becomes very large relative to the size of camera shake when performing fast panning. When this setting is not adopted and there is an attempt to correct panning as a large shake, image blur stops when starting panning, but afterward the image suddenly moves greatly at the moment when the shift lens group 104 reaches an end of correction, and this appears as a very unnatural movement.

Afterward, in step S505, the shift lens group 104 is moved to an initial position by gradually changing the output of the integrator 403 from current data to data of the initial position. This is done because it is desirable that when restarting the next instance of image stabilization operation, the position of the shift lens group 104 is at the initial position of the driving range.

On the other hand, if the average value of the angular velocity data is the predetermined value β or less in step S502 (when judged that slow panning is being performed), processing proceeds to step S506. Then, the cutoff frequency of the HPF is set according to the size of the angular velocity data. This is done in order to correct image blur while keeping trackability of the image during panning at a level that is not unnatural, because when slow panning is being performed it is impossible to completely ignore the influence of camera shake.

If the average value of the angular velocity data is the predetermined value α or less in step S501 (when judged that panning is not being performed), the cutoff frequency of the HPF is set to the value of the normal state in step S507. Also, in a case other than fast panning, the forced off setting of the image stabilization control is canceled in step S508.

Figure 4:
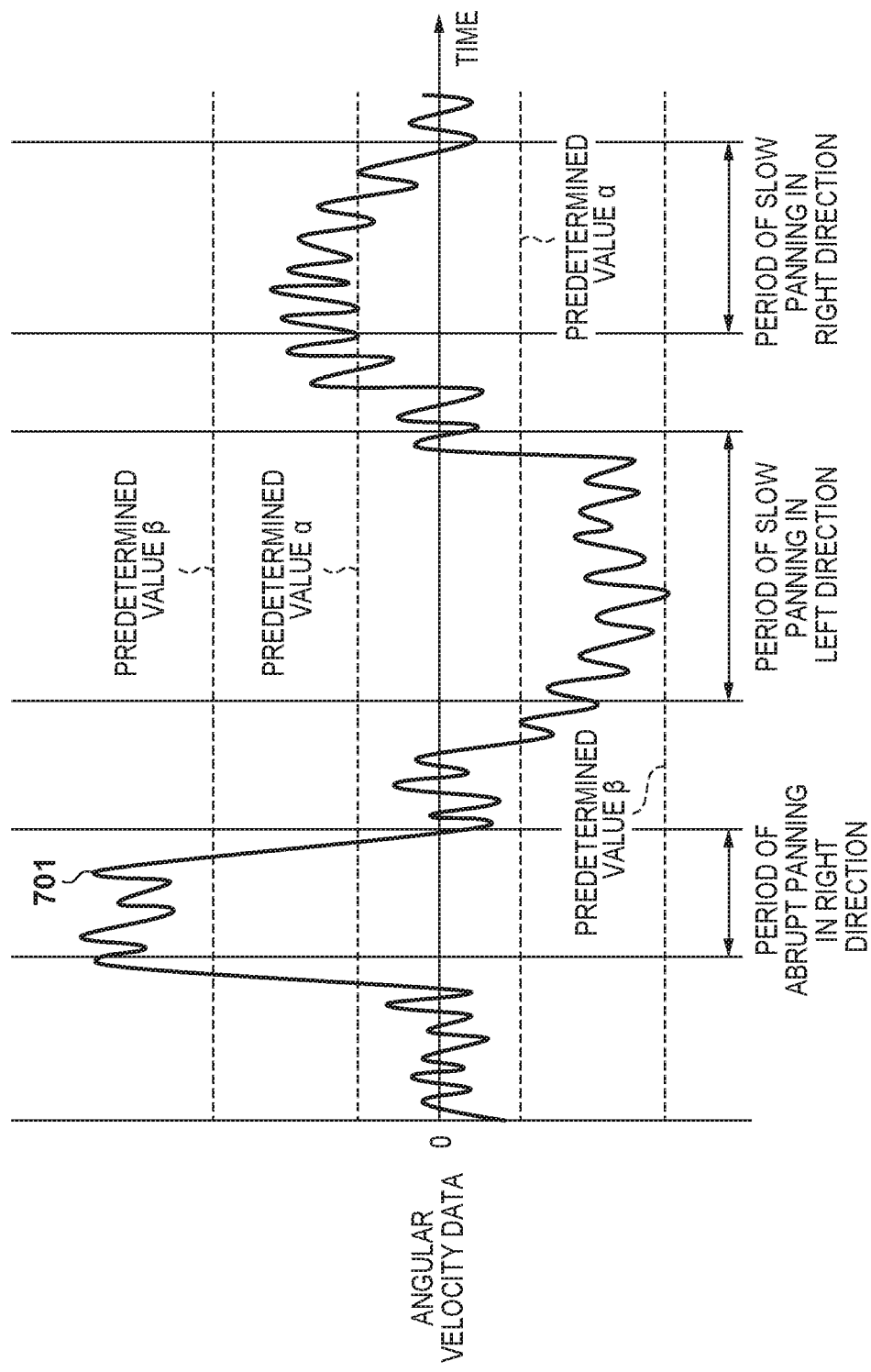
FIG. 4 shows a relationship between horizontal direction angular velocity data and predetermined values α and β, when panning is being performed.

FIG. 4 shows a relationship between angular velocity data in the horizontal direction and predetermined values α and β when panning is being performed, and an example of angular velocity data 701 is shown. In this example, output in the + direction is output when panning in the right direction, and output in the − direction is output when panning in the left direction. In the example of FIG. 4, abrupt panning in the right direction and slow panning in the left and right directions are detected. As can be seen from FIG. 4, during panning, the angular velocity data greatly deviates from the initial value (here, 0). Therefore, when the driving target value of the shift lens is calculated by integrating this data, the output of the integrator 403 becomes a very large value due to a DC-like offset component, resulting in an uncontrollable state. Therefore, when panning is detected, it is necessary to cut the DC component by increasing the HPF cutoff frequency. In the case of abrupt panning, in order to be particularly noticeable, the output of the integrator 403 is prevented from increasing by further raising the cutoff frequency. Also, if the panning speed is fast, image movement due to the panning speed becomes very large relative to camera shake, so even if the image stabilization function is turned off with respect to the panning direction, a sense of discomfort does not occur. By performing the panning control as described above, it is possible to monitor the image without a sense of discomfort in the display of the live view image during panning.

Next is a description of the panning shot assist mode. In FIG. 1, when the panning shot assist mode is set by the operation switch group 116, the moving amount detection unit 135 within the camera signal processing circuit 114 detects and outputs the moving amount of the object from the video of captured consecutive frames. Then, the microcomputer 130 receives this moving amount and the angular velocity data detected by the angular velocity sensor 107.

Here, because the angular velocity data corresponds to the panning shot speed of the camera 100, the angular velocity of the main object relative to the camera is calculated from the differential between the angular velocity data and the angular velocity calculated from the moving amount on the image plane of the main object and the current focal length of the lens. The object angular velocity calculation unit 134 calculates this main object angular velocity for each frame at the timing of processing the image for live view monitoring. Also, the object angular velocity calculation unit 134 transmits the calculated object angular velocity to the panning shot control unit 132.

Figure 5:
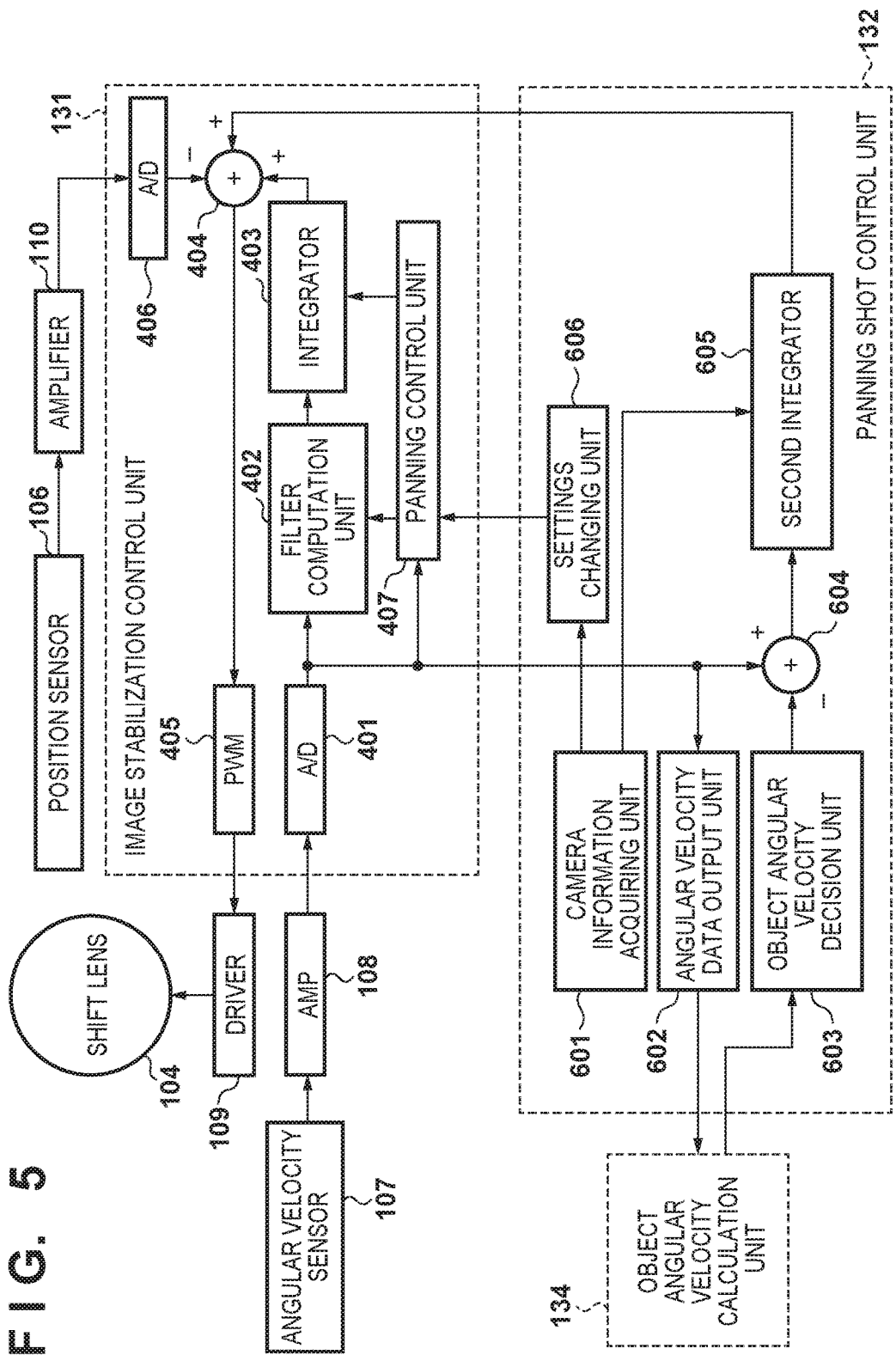
FIG. 5 is a block diagram showing a configuration of an image stabilization apparatus in a panning shot assist mode.

FIG. 5 is a block diagram showing a configuration of the image stabilization apparatus in the panning shot assist mode, with the same reference numerals assigned to configurations that are the same as in FIGS. 1 and 2. In FIG. 5, the panning shot control unit 132 is provided with a camera information acquiring unit 601, an angular velocity data output unit 602, an object angular velocity decision unit 603, an adder 604, a second integrator 605, and a settings changing unit 606. The camera information acquiring unit 601 specifically acquires settings information of the panning shot assist mode, and release information. The angular velocity data output unit 602 samples the angular velocity data of the camera at a predetermined timing and outputs the sampled data to the object angular velocity calculation unit 134. The object angular velocity decision unit 603 decides the object angular velocity calculated by the object angular velocity calculation unit 134 as the object angular velocity during exposure. The adder 604 calculates a differential between the angular velocity of the angular velocity sensor and the angular velocity of the object. The second integrator 605 performs an integration operation only for a predetermined period. The settings changing unit 606 changes settings according to mode information acquired by the camera information acquiring unit 601.

When the panning shot assist mode is set by operation of the operation switch group 116, that information is read by the camera information acquiring unit 601 and notified to the settings changing unit 606. The settings changing unit 606 changes the settings of the panning control unit 407 according to the notified mode information. The settings change performed here is a change that facilitates switching to an abrupt panning state, and specifically, the above-described predetermined values β and α for panning determination are changed. Also, the adder 604 calculates the difference between the angular velocity detected by the angular velocity sensor and the main object angular velocity, and transmits this result to the second integrator 605. The second integrator 605 starts an integration operation with a signal indicating being within the exposure period acquired by the camera information acquiring unit 601, and in other periods outputs a value such that the position of the shift lens is at the center. Here, when attempting to position the shift lens at the center position other than during the exposure period, the shift lens group 104 moves sharply from the current shift lens position to the center position at the end of the exposure period. However, immediately after the end of the exposure period, the image signal is being read from the image capturing element 112, so the image disappears on the LCD. Therefore, movement of the image due to the sharp movement of the shift lens is not a problem. Also, the output of the second integrator 605 is added together with the output of the integrator 403 and the position information of the shift lens group 104 with the adder 404, and the driving amount of the shift lens group 104 is calculated.

In a case where the panning shot assist mode is set, when a panning shot operation is actually performed by the user, the panning control unit 407 instantly performs panning control for a sudden panning state. As a result, an image stabilization operation is prohibited, and the shift lens group 104 performs correction by an amount corresponding to the differential between the angular velocity of the panning of the camera and the angular velocity of the object. Therefore, the differential between the panning speed of the camera and the speed of the object during the exposure period, which causes a panning shot failure, is canceled out by operation of the shift lens group 104 (panning shot assist), and as a result the panning shot is successful.

Figure 6:
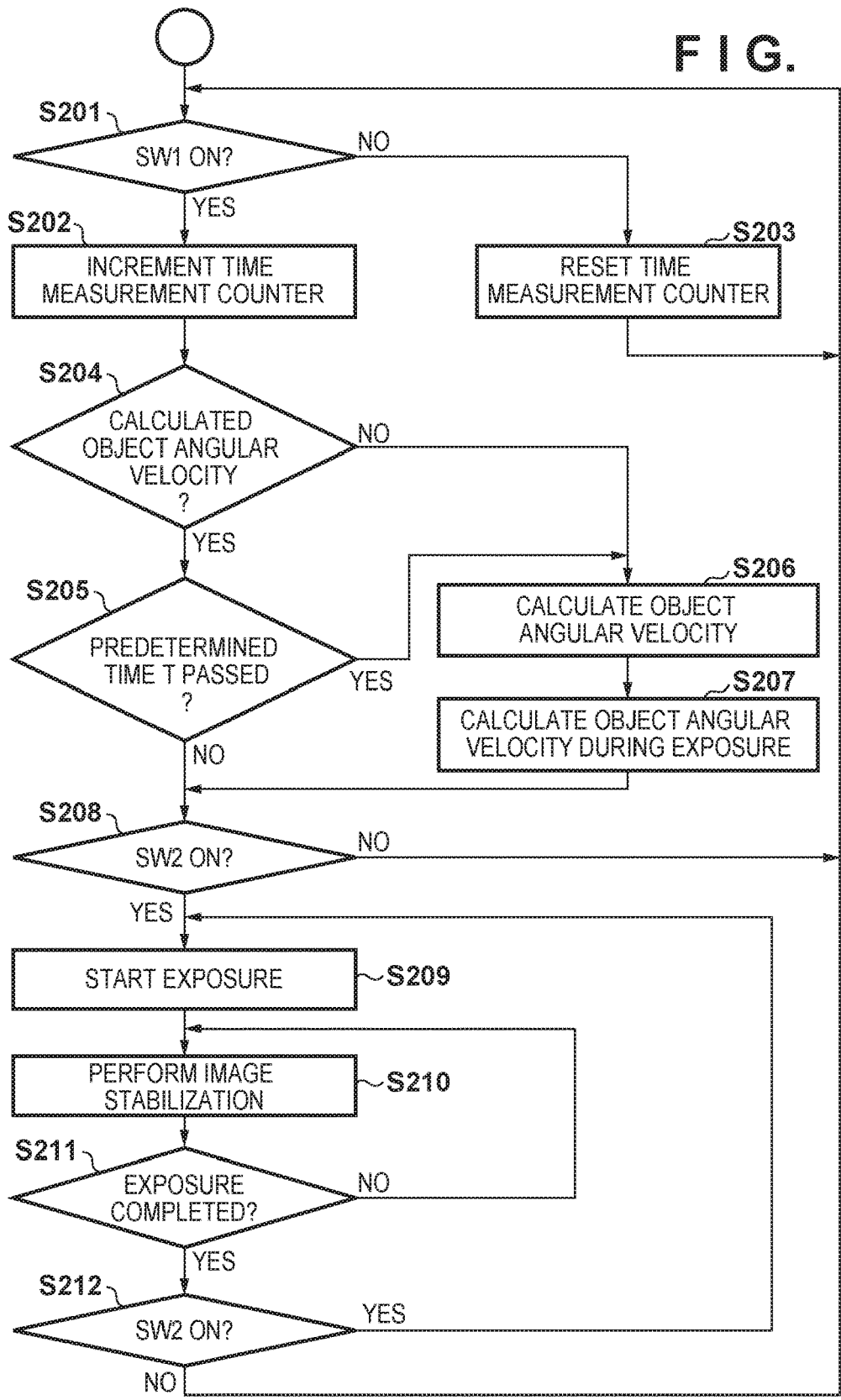
FIG. 6 is a flowchart showing a shooting operation in the panning shot assist mode.

FIG. 6 is a flowchart showing a shooting operation in the panning shot assist mode. In FIG. 6, in step S201, it is detected whether or not a release switch is half-pressed (a switch SW1 is on). When the switch SW1 is on, processing proceeds to step S202, and a time measurement counter is incremented. If the switch SW1 is not on, the time measurement counter is reset in step S203.

In step S204, a check of whether or not the main object angular velocity has already been calculated is performed. If the main object angular velocity has already been calculated, in step S205, further, a check of whether or not the time measurement counter has reached a predetermined time T is performed. If the main object angular velocity has not yet been calculated, or if the main object angular velocity has already been calculated but a certain period of time has elapsed, in step S206 the main object angular velocity is calculated. Here, re-calculation of the main object angular velocity is a measure taking into consideration a case where the speed of the main object changes over time. Every time the main object angular velocity is calculated, a notification is transmitted to the object angular velocity decision unit 603 of the panning shot control unit 132.

In step S207, angular acceleration is calculated from the object angular velocities of the past several frames acquired from the object angular velocity calculation unit 134, and the object angular velocity during exposure is calculated and decided in the object angular velocity decision unit 603, taking into consideration time lag from releasing of the release until the start of exposure. In step S208, it is detected whether or not the release switch is fully pressed (a switch SW2 is on). If the switch SW2 is not on, processing returns to step S201. When the switch SW2 is on in step S208, in step S209, shutter control is performed by the shutter control unit 133 in order to start exposure.

In step S210, the panning shot control unit 132 and the image stabilization control unit 131 move together to move the shift lens group 104 to perform image stabilization of the object. In step S211, it is judged whether or not exposure is completed, and if exposure is completed, processing proceeds to step S212, and if exposure is not completed, processing returns to step S210. In step S212, it is determined whether or not the switch SW2 is on. If the switch SW2 is on, processing returns to step S209 to start the next instance of shooting. If the switch SW2 is not on, processing returns to step S201.

Figure 7:
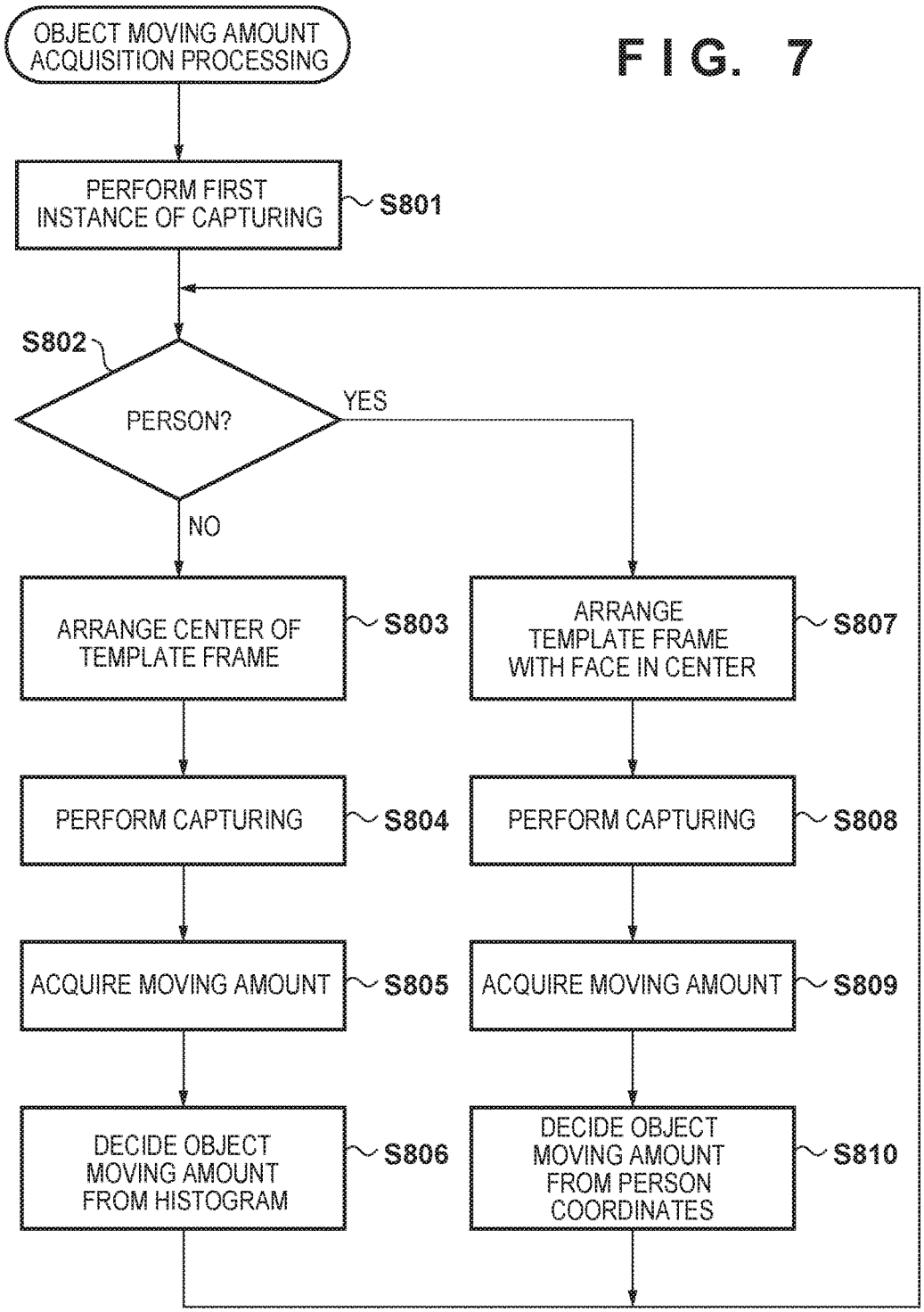
FIG. 7 is a flowchart showing operation of a moving amount detection unit.
Figure 8A:
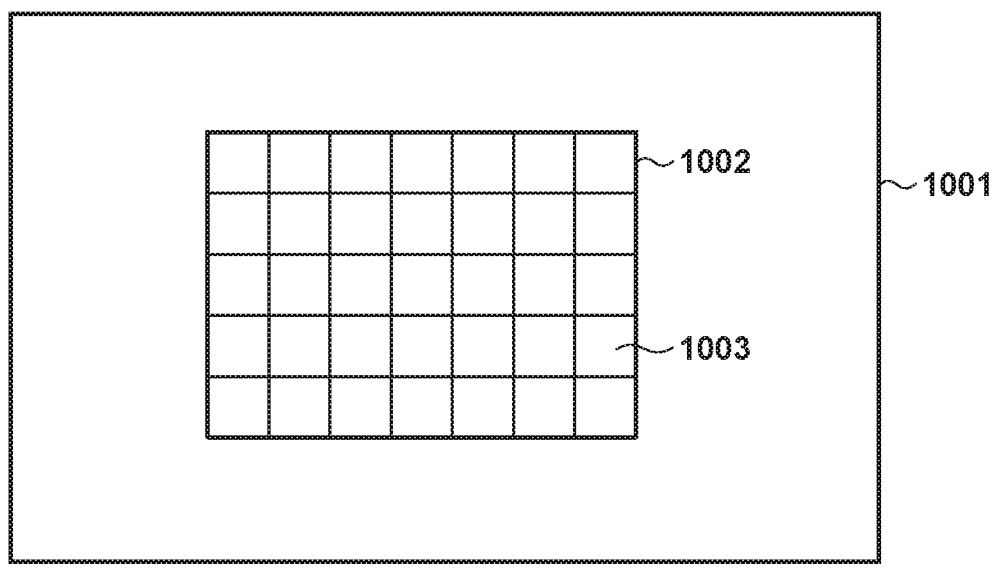
FIGS. 8A and 8B show an arrangement state of template frames.

FIG. 7 is a flowchart showing operation of the moving amount detection unit 135. In step S801, a first instance of capturing is performed to acquire a comparison source image, and then processing proceeds to step S802. In step S802, it is determined whether or not the human detection unit 136 has acquired person coordinate information. If person coordinate information has been acquired, processing proceeds to step S807, and if person coordinate information has not been acquired, processing proceeds to step S803. In step S803, before the next capture, a frame (a template frame 1002), in which a plurality of frames (moving amount acquiring frames 1003) used to acquire the moving amount of the object are arranged, is arranged on the screen, and then processing proceeds to step S804. With the template frames, it is possible to specify a plurality of positions at which to acquire a moving amount. The positions of the template frames in step S803 are arranged so as to be in the center of the angle of view. In FIG. 8A, an example of an angle of view 1001 and the template frame 1002 is shown. The template frame 1002 is a 7×5 large frame in which seven of the moving amount acquiring frames 1003 are arranged horizontally, and five of the moving amount acquiring frames 1003 are arranged vertically. During live view, the moving amount acquiring frames 1003 and the template frame 1002 are not displayed.

In step S804, moving amounts at a plurality of positions are detected according to the arrangement of the template frame 1002 while performing capture for live view, and then processing proceeds to step S805. In step S805, the detection results of the moving amounts are acquired and then processing proceeds to step S806. In step S806, a histogram is generated from the acquired moving amounts, a moving amount of the object is decided and transferred to the object angular velocity calculation unit 134, and then processing returns to step S802.

FIG. 9 shows an example of a histogram, in which the horizontal axis indicates moving amounts and the vertical axis indicates frequency. Here, the moving amounts shown in the histogram include two types, namely a moving amount corresponding to the main object the user is attempting to shoot, and a moving amount corresponding to the flowing background. In the present embodiment, because a panning shot is the objective, among the detected moving amounts, data having the smaller moving amount is the main object moving amount, and this moving amount value is the moving amount on the image plane of the main object.

Because the moving amount is closer to 0 in a set 1101, the set 1101 is judged to be the main object and a set 1102 is judged to be the background. An average of the values of the set judged to be the main object is used as the moving amount.

Figure 8B:
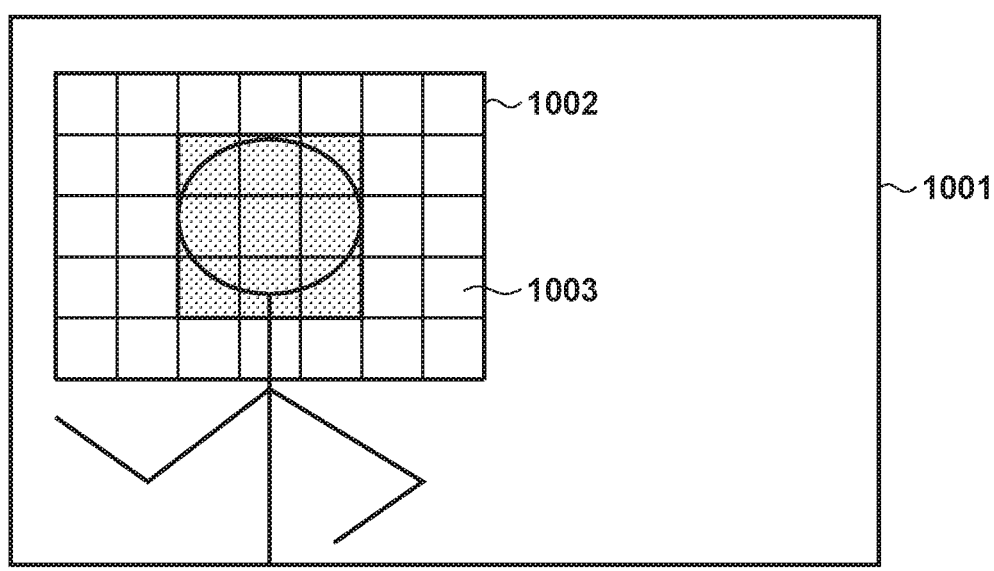

In step S807, before the next capture, the template frame 1002 is arranged with the face position of the person as the center, and then processing proceeds to step S808. FIG. 8B shows an example of the angle of view 1001 and the template frame 1002 when a person was detected. In step S808, while performing capture by live view, moving amounts at a plurality of positions in the vicinity of the person are detected according to the template frame 1002, and then processing proceeds to step S809. In step S809, the detection results of the moving amounts are acquired and then processing proceeds to step S810. In step S810, an average of the moving amounts corresponding to the frames (the gray frames in FIG. 8B) included in the size of the face is decided as the moving amount and transferred to the object angular velocity calculation unit 134, and then processing returns to step S802.

Figure 10:
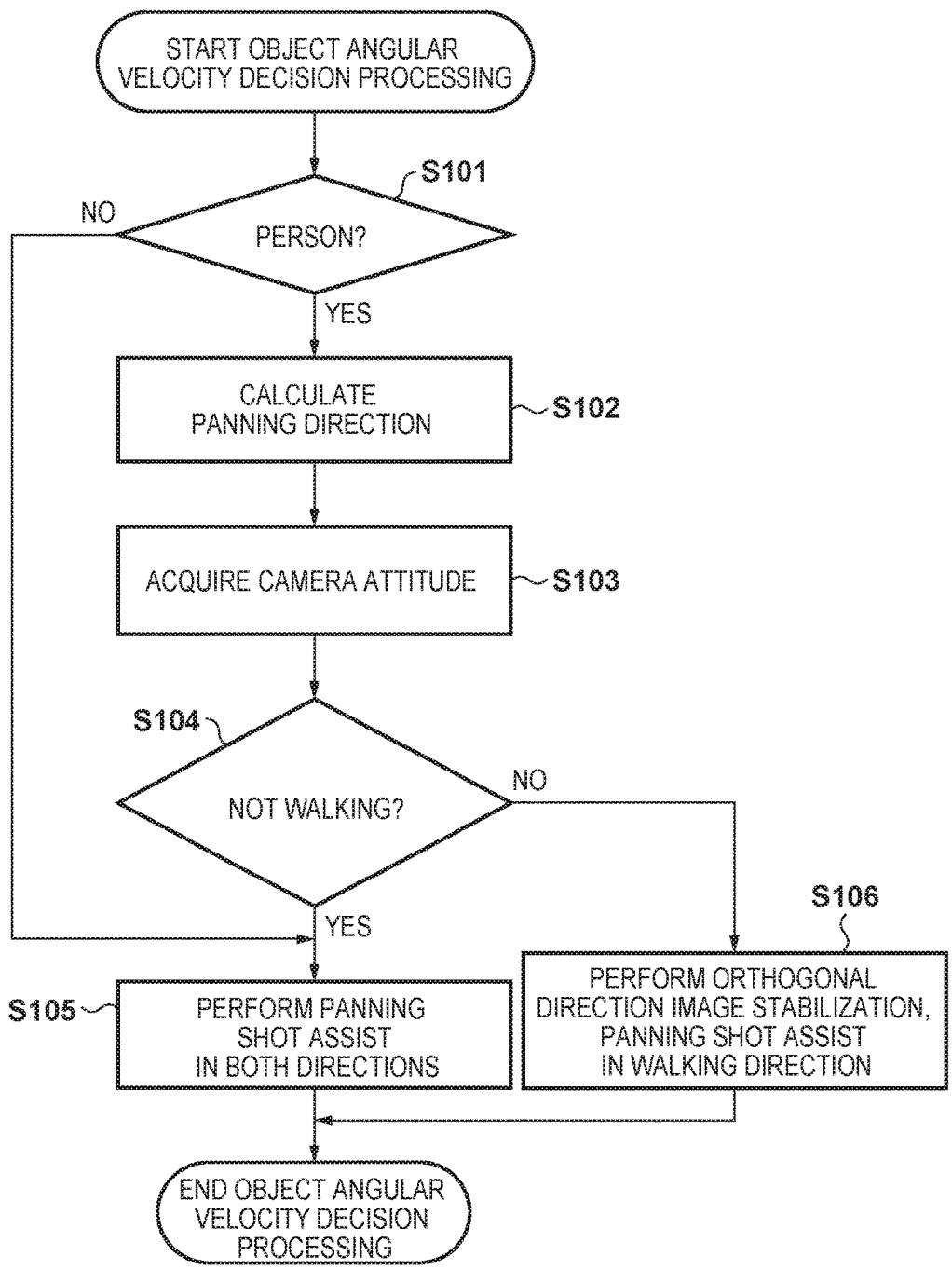
FIG. 10 is a flowchart showing object angular velocity decision processing in the first embodiment.

Next, the object angular velocity calculation unit 134 decides the object angular velocity from the moving amount of the object transferred in steps S806 and S810. FIG. 10 is a flowchart showing operation of the object angular velocity calculation unit 134. This processing is started when the object angular velocity calculation unit 134 acquires the moving amount from the moving amount detection unit 135. In step S101, it is determined whether or not the human detection unit 136 acquired coordinate information of a person. If coordinate information of a person was acquired, processing proceeds to step S102, and if coordinate information of a person was not acquired, processing proceeds to step S105. In step S102, the panning direction is calculated, and then processing proceeds to step S103. Here, with respect to output of the angular velocity sensor 107, it is assumed that in a case where the user is standing upright and has placed the camera in the normal position, the output in the left-right direction is output in the X direction and the output in the vertical direction is output in the Y direction (when the camera is placed in the vertical position, the output in the left-right direction is output in the Y direction and the output in the vertical direction is output in the X direction). In a case where among the X direction and the Y direction, one direction is larger and the other direction is smaller than "a certain angular velocity", the panning direction is the larger direction. "A certain angular velocity" is, for example, 0.5 degrees per second.

In step S103, the attitude of the camera 100 is acquired by the attitude detection unit 137, and then processing proceeds to step S104. In step S104, a non-walking determination is performed, and if judged (the result of the determination) that walking is not being performed, processing proceeds to step S105, and if not judged that walking is not being performed, processing proceeds to step S106. Here, the condition to judge that the user is not walking is "the attitude of the camera 100 is in the normal position and the panning direction is the Y direction" and "the attitude of the camera 100 is in the vertical position and the panning direction is the X direction". In other words, regarding the direction of panning the camera 100, when the direction perpendicular to the ground is dominant, the object person moves in the upward or downward direction, and so it is judged that the person is not walking. For example, this is the case when tracking the movement of a person who rides a free-fall ride of an amusement park. By devising "a certain angular velocity", which is a threshold in the determination in the panning direction, it is possible to extend the non-walking determination also with respect to panning in a diagonal direction. Note that the term "walking" as used in the present embodiment refers to movement generally, such as movement accompanying a back-and-forth motion in a direction orthogonal to a traveling direction while a person proceeds in the traveling direction, also including a case where the person is running, or the like. Also, although described here as a "person", walking by other than a person is also acceptable.

In step S105, in order to perform object blur correction (panning shot assist) in both the "horizontal direction" and the "direction orthogonal to the horizontal direction", in both directions, the moving amount is converted to angular velocity using the focal length information and the pixel pitch. The panning shot assist is performed in both the "horizontal direction" and the "direction orthogonal to the horizontal direction", because even if the movement in the vertical direction is dominant in step S104, there often is a movement component not only in the "vertical direction" but also in the "horizontal direction". Then, the object angular velocity calculated taking into consideration the angular velocity acquired by the angular velocity sensor 107 is transferred to the panning shot control unit 132, and then processing is ended.

In step S106, control is performed such that blur correction for panning shot assist is performed in the "walking direction (traveling direction of the person)", and blur correction for panning shot assist is not performed in the "direction orthogonal to the walking direction", so image stabilization is only performed to correct shake due to camera shake, such as hand shake. In other words, with respect to the "walking direction", the moving amount is converted to angular velocity using focal length information and pixel pitch, and the object angular velocity calculated taking into consideration the angular velocity acquired by the angular velocity sensor 107 is transferred to the panning shot control unit 132. On the other hand, with respect to "the direction orthogonal to the walking direction", only the angular velocity acquired from the angular velocity sensor is transferred to the panning shot control unit 132, and only image stabilization to correct shake due to camera shake, such as hand shake, is performed. Alternatively, only image stabilization to correct shake due to camera shake such as hand shake may be performed by notifying that only image stabilization processing to correct shake due to camera shake such as hand shake will be performed. In step S106, the above control is performed and then processing is terminated.

According to the present embodiment, when a person is detected, detection of whether the object person is not walking is performed based on the attitude and panning direction of the camera. If there is a possibility that the object person is walking, only image stabilization to correct shake due to camera shake such as hand shake is performed, without performing blur correction for panning shot assist of the object in the "direction orthogonal to the walking direction". Therefore, it is possible to prevent opposite correction due to performing blur correction for panning shot assist, and so it is possible to provide an image capturing apparatus capable of good panning shot assist.

Second Embodiment

Figure 11:
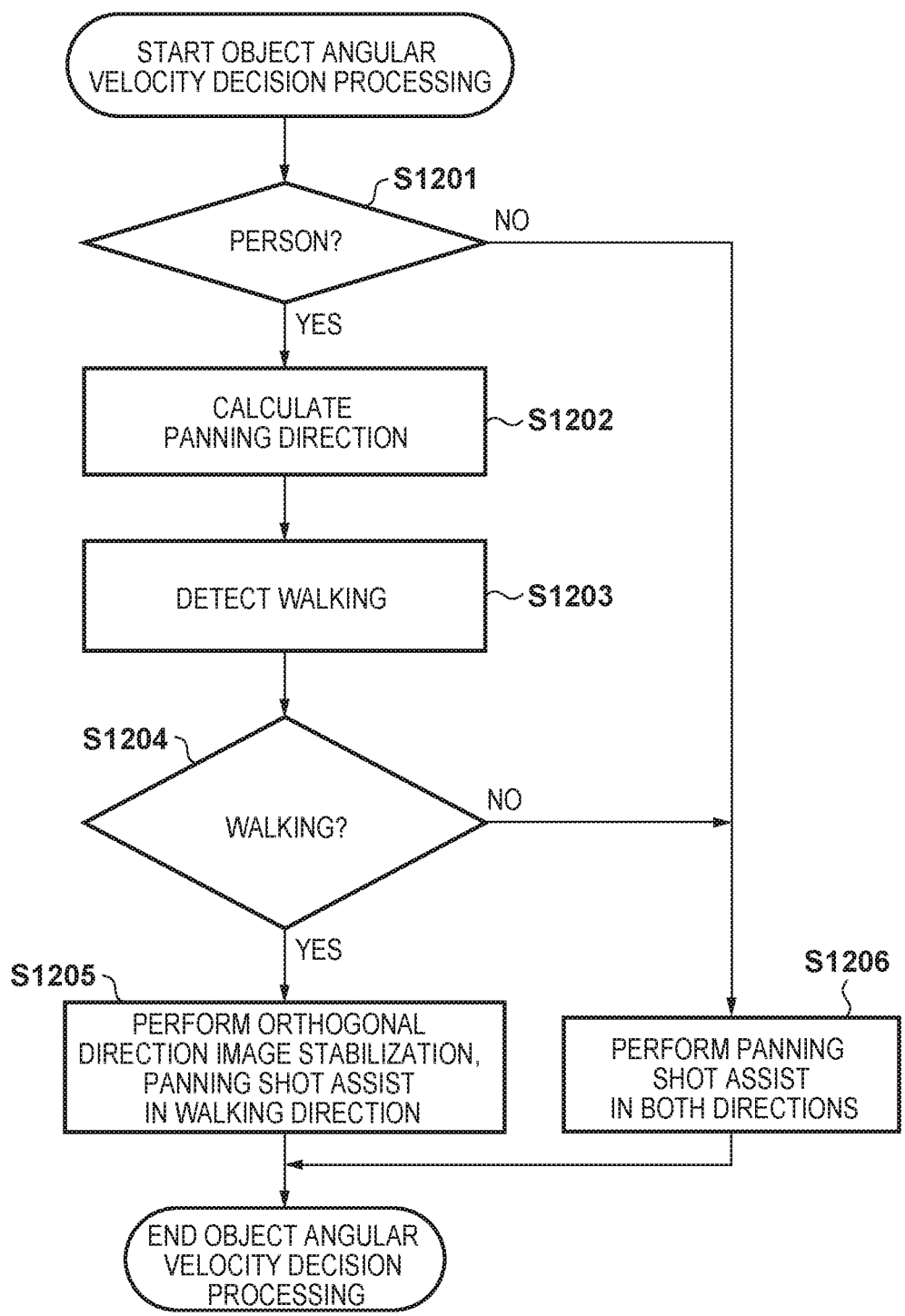
FIG. 11 is a flowchart showing object angular velocity decision processing in a second embodiment.

Following is a description of a second embodiment of the present invention. FIG. 11 is a flowchart showing operation of the object angular velocity calculation unit 134 in the second embodiment. The difference from the operation of the objective velocity calculation unit 134 in the first embodiment is that "not walking" is detected in the first embodiment, but "walking" is detected in the second embodiment. This processing is started when the object angular velocity calculation unit 134 acquires a moving amount from the moving amount detection unit 135.

Figure 13A:
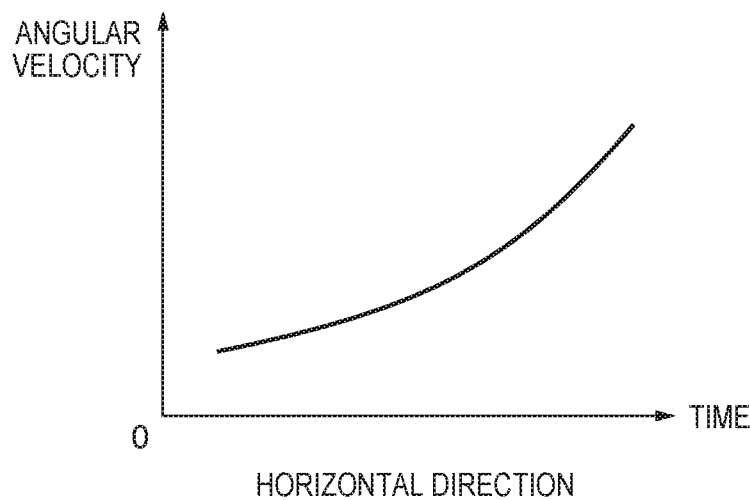
FIGS. 13A and 13B illustrate angular velocity change of a person.
Figure 13B:
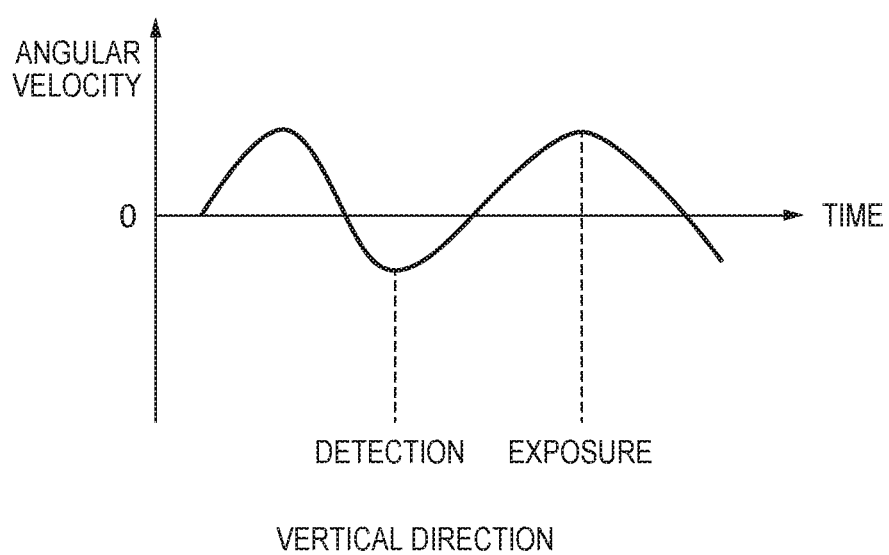

In step S1201, it is determined whether or not the human detection unit 136 acquired coordinate information of a person. If coordinate information of a person was acquired, processing proceeds to step S1202, and if coordinate information of a person was not acquired, processing proceeds to step S1206. In step S1202, similarly to step S102 in FIG. 10, the panning direction is calculated, and then processing proceeds to step S1203. In step S1203, the acquired object angular velocity is held, and whether the person is walking is detected from the past angular velocity change and the panning direction, and then processing proceeds to step S1204. Here, determination of walking is performed as follows. That is, if the history of the angular velocity in the direction orthogonal to the panning direction takes plus and minus values as shown in FIG. 13B in a period of 1 to 2 seconds, and repeats plus and minus values in that cycle, the object person is judged to be walking. Also, because the actual output value of the angular velocity sensor often has an offset, the value increases and decreases repeatedly based on the offset. As a countermeasure against the angular velocity sensor having such an offset, with attention to the amount of change of the angular velocity, the object person may be judged to be walking if the change amount periodically repeats plus and minus values.

In step S1204, the walking determination is performed, and if judged that the object person is walking, processing proceeds to step S1205, and if not judged that the object person is walking, processing proceeds to step S1206. In step S1205, control is performed such that blur correction for panning shot assist is performed in the "walking direction (traveling direction of the person)", and blur correction for panning shot assist is not performed in the "direction orthogonal to the walking direction", so image stabilization is only performed to correct shake due to camera shake, such as hand shake.

In step S1206, in order to perform object blur correction (panning shot assist) in both the "horizontal direction" and the "direction orthogonal to the horizontal direction", in both directions, the moving amount is converted to angular velocity using the focal length information and the pixel pitch.

According to the present embodiment, when a person is detected, detection of whether the object person is walking is performed based on changes in angular velocity in the direction orthogonal to the panning direction. When the object person is walking, only image stabilization to correct shake due to camera shake such as hand shake is performed, without performing blur correction for panning shot assist of the object in the "direction orthogonal to the walking direction". Therefore, it is possible to prevent opposite correction due to performing blur correction for panning shot assist, and so it is possible to provide an image capturing apparatus capable of good panning shot assist.

Third Embodiment

Figure 12:
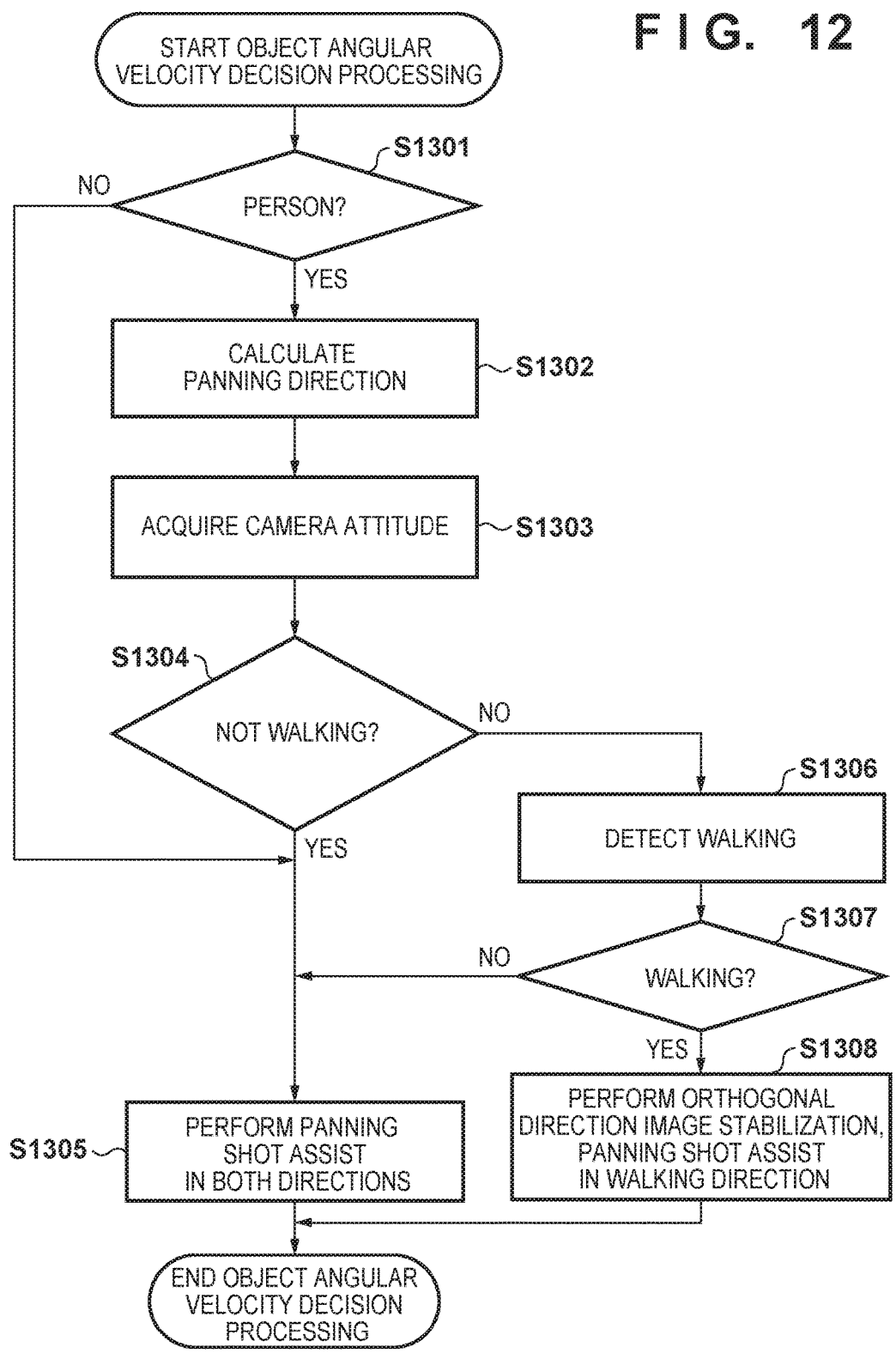
FIG. 12 is a flowchart showing object angular velocity decision processing in a third embodiment.

Following is a description of a third embodiment of the present invention. FIG. 12 is a flowchart showing operation of the object angular velocity calculation unit 134 in the third embodiment. In this third embodiment, the operation of the first embodiment and the operation of the second embodiment are appropriately combined.

Steps S1301 to S1303 are similar to steps S101 to S103 of the first embodiment. In step S1304, a non-walking determination is performed, and when judged that the object person is not walking, processing proceeds to step S1305, and when not judged that the object person is not walking, processing proceeds to step S1306. The content of the determination is the same as step S104 in FIG. 10. Step S1305 is the same as step S105 in FIG. 10. Step S1306 is the same as step S1203 in FIG. 11. In step S1307, the walking determination is performed in the same manner as in step S1204 in FIG. 11, and if determined that the object person is walking, processing proceeds to step S1308, and if not determined that the object person is walking, processing proceeds to step S1305. Step S1308 is the same as step S106 in FIG. 10.

According to the present embodiment, first, when a person is detected, detection of whether the object person is not walking is performed based on the attitude and panning direction of the camera. When there is no possibility that the object person is walking, blur correction for panning shot assist is performed in both the "horizontal direction" and the "direction orthogonal to the horizontal direction". When there is a possibility that the object person is walking, furthermore, walking is detected, and if the object person is walking, only image stabilization to correct shake due to camera shake such as hand shake is performed, without performing blur correction for panning shot assist of the object in the "direction orthogonal to the walking direction". If the object person is not walking, blur correction for panning shot assist is performed in both the "horizontal direction" and the "direction orthogonal to the horizontal direction". Therefore, it is possible to prevent opposite correction due to performing blur correction for panning shot assist, and so it is possible to provide an image capturing apparatus capable of good panning shot assist.

Above, preferred embodiments of the present invention are described, but the present invention is not limited to these embodiments, and various modifications and changes are possible within the scope of the gist thereof.

For example, in the above embodiments, as a configuration correcting image blur, a case is described where the shooting lens unit is provided with a shift lens that moves in a direction orthogonal to the optical axis. However, the present invention is not limited to this, and a configuration may also be adopted in which an optical element that changes the optical path by moving in a direction different than the optical axis of the shooting lens, for example by tilting, is used, or a configuration may be adopted in which the optical path is changed using a variable apex angle prism or the like. Also, image blur correction may be performed by shifting the image capturing element.

Also, in the above embodiments, a case is described where camera shake is detected by an angular velocity sensor arranged in the camera main body, but the angular velocity sensor may also be arranged in the shooting lens.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-110216, filed Jun. 1, 2016, which is hereby incorporated by reference herein in its entirety.

What is claimed is:

1. An image stabilization apparatus, comprising:
at least one processor and/or circuitry;
a first calculation unit configured to calculate an angular velocity of movement of an image capturing apparatus;
a second calculation unit configured to calculate a moving amount of an object from a plurality of images captured by an image capturing device of the image capturing apparatus;
a third calculation unit configured to calculate an angular velocity of movement of the object based on output of the first and second calculation units;
a determination unit configured to determine whether or not the object is walking; and
a selection unit configured to select, based on a determination result of the determination unit, whether to perform control such that an image stabilization device corrects image blur of the object based on the angular velocity of movement of the image capturing apparatus calculated by the first calculation unit and the angular velocity of movement of the object calculated by the third calculation unit, or such that the image stabilization device corrects image blur of the object based on the angular velocity of movement of the image capturing apparatus calculated by the first calculation unit,
wherein the first calculation unit, the second calculation unit, the third calculation unit, the determination unit and the selection unit are implemented by the at least one processor or the circuitry or a combination thereof.

2. The image stabilization apparatus according to claim 1, wherein the selection unit, when determined by the determination unit that the object is walking, with respect to a traveling direction of the object, selects to perform control such that the image stabilization device corrects image blur of the object based on the angular velocity of movement of the image capturing apparatus calculated by the first calculation unit and the angular velocity of movement of the object calculated by the third calculation unit, and with respect to a direction orthogonal to the traveling direction of the object, selects to perform control such that the image stabilization device corrects image blur of the object based on the angular velocity of movement of the image capturing apparatus calculated by the first calculation unit.

3. The image stabilization apparatus according to claim 1, wherein the selection unit, when determined by the determination unit that the object is not walking, with respect to both the traveling direction of the object and a direction orthogonal to the traveling direction of the object, selects to perform control such that the image stabilization device corrects image blur of the object based on the angular velocity of movement of the image capturing apparatus calculated by the first calculation unit and the angular velocity of movement of the object calculated by the third calculation unit.

4. The image stabilization apparatus according to claim 1, wherein the determination unit determines that the object is not walking when, regarding a direction of shaking the image capturing apparatus to perform a panning shot, a direction perpendicular to the ground is dominant.

5. The image stabilization apparatus according to claim 1, wherein the determination unit determines whether or not the object is walking from a history of movement shaking the image capturing apparatus to perform a panning shot.

6. The image stabilization apparatus according to claim 1, wherein the determination unit determines a direction of shaking the image capturing apparatus to perform a panning shot, and then further determines whether or not the object is walking from a history of movement shaking the image capturing apparatus to perform a panning shot.

7. The image stabilization apparatus according to claim 1, wherein the at least one processor and/or circuitry further function as:
a human detection unit configured to detect a person as the object,
wherein the second calculation unit calculates a moving amount of the person from a plurality of images captured by the image capturing device.

8. The image stabilization apparatus according to claim 1, wherein the at least one processor and/or circuity further function as:
an attitude detection unit configured to detect an attitude of the image capturing apparatus.

9. The image stabilization apparatus according to claim 1, wherein the image stabilization device is a shift lens provided in an image capturing optical system and configured to move in a direction different than the optical axis of the image capturing optical system.

10. The image stabilization apparatus according to claim 1,
wherein the image stabilization device has a driving device configured to move an image capturing element in a direction orthogonal to the optical axis of the image capturing optical system.

11. A control method of an image stabilization apparatus, comprising:
first calculation of calculating an angular velocity of movement of an image capturing apparatus;
second calculation of calculating a moving amount of an object from a plurality of images captured by an image capturing device of the image capturing apparatus;

third calculation of calculating an angular velocity of movement of the object based on output of the first calculation and the second calculation;

determining whether or not the object is walking; and selecting, based on a determination result in the determining, whether to perform control such that an image stabilization device corrects image blur of the object based on the angular velocity of movement of the image capturing apparatus calculated by the first calculation and the angular velocity of movement of the object calculated by the third calculation, or such that the image stabilization device corrects image blur of the object based on the angular velocity of movement of the image capturing apparatus calculated by the first calculation.

12. A non-transitory computer-readable storage medium storing a program for causing a computer to execute a control method of an image stabilization apparatus, comprising:

first calculation of calculating an angular velocity of movement of an image capturing apparatus;

second calculation of calculating a moving amount of an object from a plurality of images captured by an image capturing device of the image capturing apparatus;

third calculation of calculating an angular velocity of movement of the object based on output of the first calculation and the second calculation;

determining whether or not the object is walking; and selecting, based on a determination result in the determining, whether to perform control such that an image stabilization device corrects image blur of the object based on the angular velocity of movement of the image capturing apparatus calculated by the first calculation and the angular velocity of movement of the object calculated by the third calculation, or such that the image stabilization device corrects image blur of the object based on the angular velocity of movement of the image capturing apparatus calculated by the first calculation.

* * * * *